June 11, 1946.  T. G. WILLIAMS  2,402,109
DEVICE FOR TEACHING DANCING
Filed Oct. 6, 1944  2 Sheets-Sheet 1
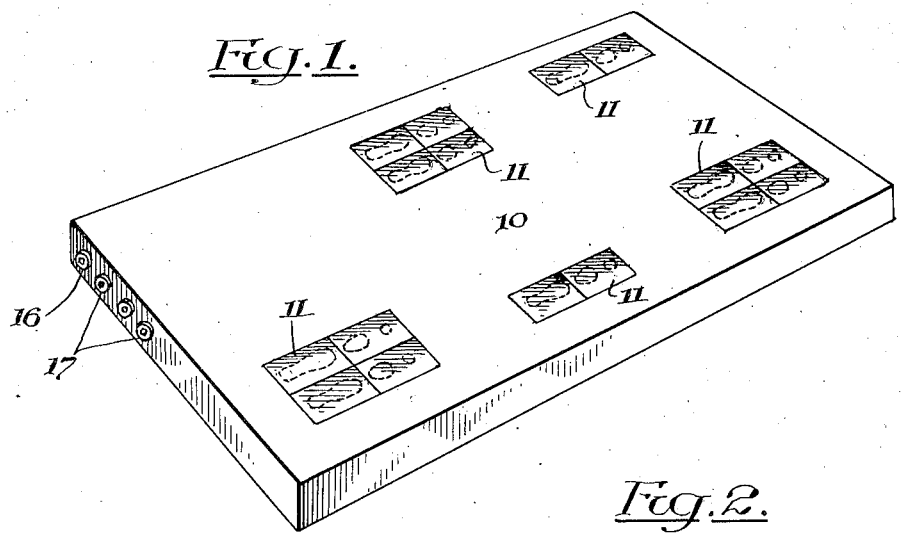
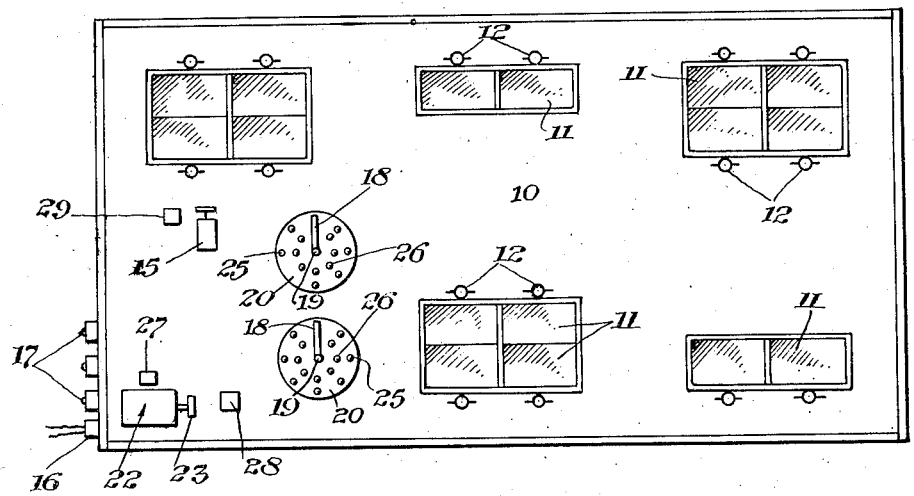
INVENTOR.
Thomas Gwynfryn Williams
BY
Francis E. Boyer
Attorney June 11, 1946.  T. G. WILLIAMS  2,402,109
DEVICE FOR TEACHING DANCING
Filed Oct. 6, 1944  2 Sheets-Sheet 2

INVENTOR.
Thomas Gwynfryn Williams
BY Francis E. Boyce
Attorney

Patented June 11, 1946

2,402,109

UNITED STATES PATENT OFFICE 2,402,109

DEVICE FOR TEACHING DANCING

Thomas Gwynfryn Williams, Johannesburg, Transvaal, Union of South Africa

Application October 6, 1944, Serial No. 557,407
In the Union of South Africa November 22, 1943

5 Claims. (Cl. 35—29)

This invention relates to a device for teaching dancing to individuals or to couples.

The chief object of the invention is to provide a special dance floor having fixed therein a pattern showing in sequence the desired position of the feet of the dancer or the dancers during a rhythmic series of steps in any particular dance. A further object is to form the pattern by a number of blocks let into the floor, properly positioned and marked to indicate the required sequence of the steps to be carried out in the dance. A still further object is to provide a signal connected with said blocks showing the sequence desired; also said signal will indicate, when the particular block is danced upon, the next immediate position in the proper series of steps. In addition blocks, when stepped on, can be made to issue a warning if the step taken or about to be taken is out of the required sequence.

The invention is illustrated in its preferred form in the accompanying drawings which are diagrammatic:

Fig. 1 is a perspective view of the floor.

Fig. 2 is a view of the underside of the floor.

Fig. 3 shows an electric current switching device.

Figure 5:
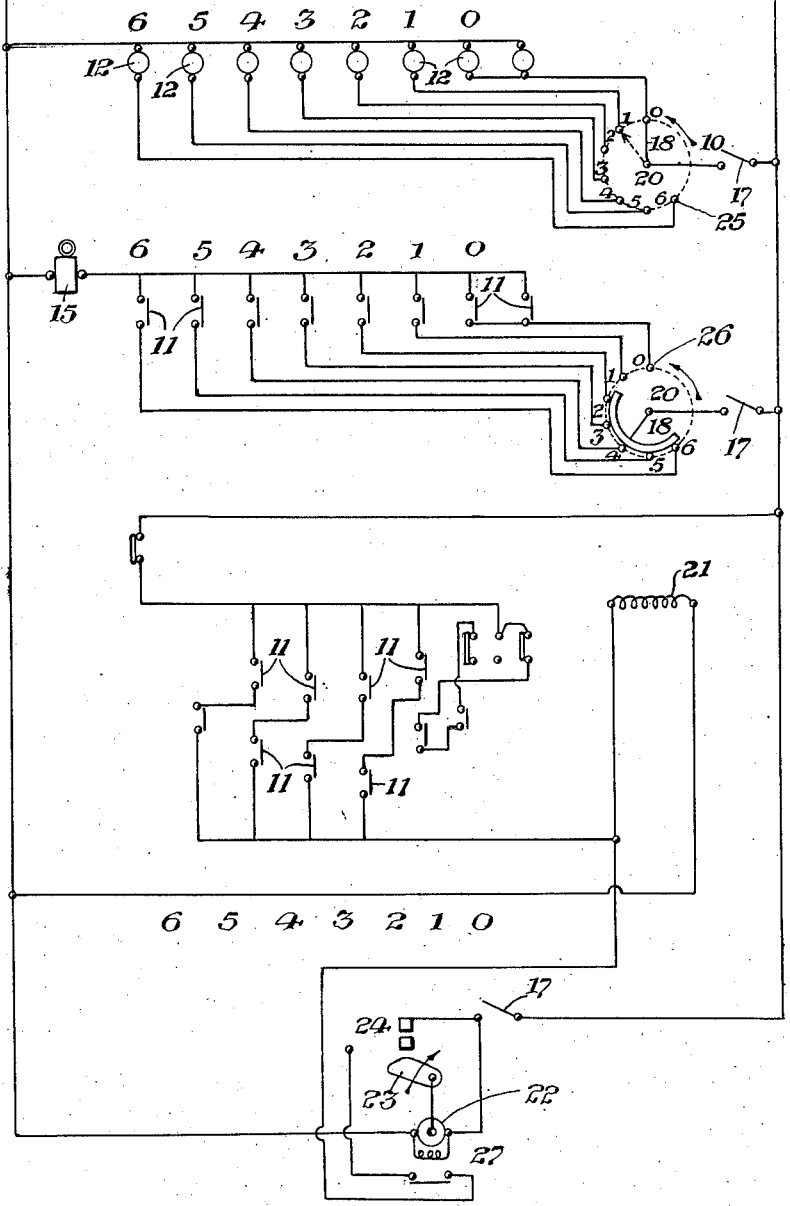

Fig. 4 a section of the blocks in the floor, and

Fig. 5 a schematic arrangement of part of the necessary wiring to the essential components.

10 is the dance floor in the form of a low stage having blocks 11 which may be of glass to be illuminated by the lamps 12 showing through the block a representation of a foot. The glass may be coloured red and blue to represent the positions of the feet of the male or female dancer. There are a number of blocks 11 placed as required for carrying out the dancing steps.

The floor 10 is large enough to provide room for a couple of dancers to carry out a complete series of steps making up one complete movement in the particular dance. The pattern to be followed by the feet of the dancers is made up by the blocks 11 each the size of the foot or portion of the foot, and each block separately formed of translucent material capable of a slight downward movement under pressure. Said movement serves to make an electrical connection through contacts 13 associated with each block. The particular electric lamps will be lit and will indicate, by illuminating the particular block or blocks, the next steps to be taken. Springs 14 are provided below the blocks at one end thereof to restore them to their normal position once the dancers' weight is removed therefrom, the opposite ends of adjacent blocks being supported in a rabbetted floor beam 10ª. Also pressure on a block which is out of sequence in the dance step indicates when such wrong step is made by sounding a warning, for instance by the ringing of a bell 15.

The wiring diagram Fig. 5 shows in schematic form the necessary electrical connections. The wiring in Figs. 1 and 2 is omitted for clearness. The supply lines for the electric current are indicated at 16, and 17 are switches controlling the distribution of the current to the signals for the set of blocks 11 for the male steps, for the set of blocks 11 for the female steps and for the mechanism for illustrating the steps without the dancers.

Electrically connected with the blocks through suitable contacts 18 is a switching device (Fig. 3) which may take the form of a disc 20 having a spindle 19 adapted to rotate step by step by a solenoid and ratchet wheel 21 and so make electrical contacts in regular sequence to the rhythmic path of the dance which will be indicated by a series of illuminated patches on the floor by the lamps 12 shining through the blocks 11. When it is desired to illustrate the dance movement or steps by illuminating the blocks 11 in proper sequence and without the dancers operating, by their weight, the electric contacts 13 associated with the blocks 11, a motor 22 is provided which drives a cam 23 to close a switch 24 and so provide the necessary electric impulses to solenoid 21. Thus the solenoid 21 is operated to rotate the fingers 18 over the contact points 25 arranged to connect the current to energise the lamps 12 in the desired sequence by, either the steps of the dancers on the floor blocks 11 or by the motor 22.

The switching disc 20 may embody also a second series of contacts 26 electrically connected to ring a warning bell 15 when a contact 13 is made by pressing a block 11 out of desired sequence in the proper execution of the dance step.

The blocks 11 are set in pairs to indicate the position of each partner in the dance and the illumination of the blocks may be made in distinct colors to illustrate the proper position of the male and female feet. For this reason the blocks 11 are made in pairs and the disc 20 and the necessary electrical contacts are duplicated one for the male and one for the female.

In Fig. 5 are shown the necessary wiring diagrams. The top one shows the connections to the lamps 12. The lower one shows the connection to the bell 15. The next shows the control contacts to comply with the proper sequence of the switches.

The motor 22 may be switched on to operate while the dancers are making their steps and will act to set a pace for them through the audible clicking sound made when the switches are operated. To avoid the current remaining switched on to the lamp circuit when the motor 22 stops in a position to close the switch 24 there may be provided a relay 27 in the circuit and providing a magnetically operated spring opened switch. 28 and 29 are transformers for the control contacts and the bell circuits respectively.

The stage may be hinged to the wall of a room so that it can be turned up vertically against the wall when not in use and its bottom side may be covered and suitably decorated to blend with the wall finish or coloring.

This invention provides a full size chart for teaching dancing steps showing the proper sequence of the steps. Such movement may be illustrated through a properly moving switching device driven by a motor or be made by the dancer himself as the dance is performed.

What I claim as new and desire to secure by Letters Patent is:

1. A dancing floor having a plurality of depressible blocks positioned therein, a series of signalling devices for indicating a predetermined sequence of steps to be taken, a source of electrical supply, means for selectively closing the circuit from said source through said signalling devices, and electrical contacts associated with each of said blocks and actuated by the depression thereof to operate said selective means thereby to close the circuit through the signal indicating the next step in the sequence.

2. A dancing floor adapted to be connected to electric power supply lines having in combination, depressible blocks positioned in said floor to indicate a predetermined sequence of steps, electric contacts associated with the blocks to be operated thereby, mechanism actuated by electric impulses received through said contacts, electric switches connected with said mechanism for actuation thereby, and a series of signalling devices in the circuit of said switches whereby the signalling devices are energized in response to the depression of the blocks in a predetermined sequence.

3. A dancing floor adapted to be connected to electric power supply lines having in combination, a series of blocks positioned in said floor to indicate a predetermined sequence of steps, electrically operated signals associated with said blocks, normally open switches in circuit with said signals, mechanism for actuating said switches, and a motor driven switch for closing the circuit through said mechanism thereby to provide electric impulses to said mechanism for operating the same.

4. A dancing floor adapted to be connected to electric power supply lines having in combination depressible blocks positioned to indicate a predetermined sequence of steps on said floor, audible and visual signalling means associated with each block, normally open switches in circuit with said signals, mechanism for closing said switches in predetermined sequence, switches disposed in position to be operated by the depression of said blocks to provide electric impulses to energize said mechanism, an independent switch for closing said switches in proper sequence, and an electric motor for actuating said independent switch to operate the mechanism.

5. A dancing floor adapted to be connected to electric power supply lines having in combination, duplicate sets of depressible blocks positioned in said floor to indicate a predetermined sequence of steps, electric contacts associated with the blocks to be operated thereby, mechanism actuated by electric impulses received through said contacts and electric switches, and signalling means in circuit with said mechanism for operation thereby to energize said signalling means by the depression of the blocks by dancers making the steps of a dance.

THOMAS GWYNFRYN WILLIAMS.